(12) United States Patent
Isokawa

(10) Patent No.: US 10,803,887 B2
(45) Date of Patent: Oct. 13, 2020

(54) MAGNETIC DISK DRIVE AND RECORDING METHOD FOR MAGNETIC DISK DRIVE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Hiroshi Isokawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/538,027

(22) Filed: Aug. 12, 2019

(65) Prior Publication Data

US 2020/0227074 A1 Jul. 16, 2020

(30) Foreign Application Priority Data

Jan. 15, 2019 (JP) .................................. 2019-004726

(51) Int. Cl.
| | |
|---|---|
| *G11B 20/12* | (2006.01) |
| *G11B 5/09* | (2006.01) |
| *G11B 5/012* | (2006.01) |
| *G11B 20/14* | (2006.01) |
| *G11B 5/00* | (2006.01) |

(52) U.S. Cl.
CPC ................ *G11B 5/09* (2013.01); *G11B 5/012* (2013.01); *G11B 2005/0021* (2013.01)

(58) Field of Classification Search
CPC ......... G11B 5/012; G11B 5/1278; G11B 5/09; G11B 27/36; G11B 5/59633; G11B 5/00; G11B 20/14; G11B 5/59661; G11B 5/59627; G11B 5/59655; G11B 2020/1287; G11B 20/12; G11B 20/1419
USPC ................................... 360/75, 48, 77.08, 43
See application file for complete search history.

(56) References Cited

U.S. PATENT DOCUMENTS

| | | | |
|---|---|---|---|
| 8,027,118 B2 | 9/2011 | Ezawa et al. | |
| 8,619,379 B2 * | 12/2013 | Nonaka .................... | G11B 5/82 360/48 |
| 8,922,936 B2 * | 12/2014 | Okamoto ............... | G11B 5/012 360/48 |
| 9,070,411 B1 * | 6/2015 | Ellis .................... | G11B 5/59661 |

(Continued)

*Primary Examiner* — Nabil Z Hindi
(74) *Attorney, Agent, or Firm* — Kim & Stewart LLP

(57) ABSTRACT

According to one embodiment, there is provided a magnetic disk drive comprising a magnetic disk, a magnetic head configured to read/write data from/to the magnetic disk, a signal processing circuit configured to convert data to be recorded on the magnetic disk into a write signal, and to output the write signal to the magnetic head that generates a recording magnetic field corresponding to the write signal, and a recording control circuit configured to control the signal processing circuit and the magnetic head to record, in a target recording area of the magnetic disk, first data in the target recording area with a recording magnetic field having a first frequency, and to write, second data different from the first data over the first data with a recording magnetic field having a second frequency higher than the first frequency.

14 Claims, 11 Drawing Sheets

(56) References Cited

U.S. PATENT DOCUMENTS

| | | | |
|---|---|---|---|
| 9,336,831 B2 | 5/2016 | Burnett et al. | |
| 9,792,949 B1 | 10/2017 | Ma et al. | |
| 2007/0211368 A1* | 9/2007 | Shibano | G11B 5/59688 360/75 |
| 2009/0323209 A1* | 12/2009 | Kiyono | B82Y 10/00 360/31 |
| 2010/0103561 A1 | 4/2010 | Yamazaki | |
| 2013/0010389 A1* | 1/2013 | Nonaka | G11B 5/82 360/135 |

* cited by examiner

MAGNETIC DISK DRIVE AND RECORDING METHOD FOR MAGNETIC DISK DRIVE

CROSS-REFERENCE TO RELATED APPLICATIONS

This application is based upon and claims the benefit of priority from Japanese Patent Application No. 2019-004726, filed Jan. 15, 2019, the entire contents of which are incorporated herein by reference.

FIELD

Embodiments of the present invention relate to a magnetic disk drive and a recording method for the magnetic disk drive.

BACKGROUND

In the field of magnetic disk drives represented by hard disk drives (HDD), high density and large capacity are being promoted.

In order to achieve high recording density, an assist recording technique for lowering the intensity of a recording magnetic field necessary for magnetization reversal is being developed.

Microwave-Assisted Magnetic Recording (MAMR) is an assist recording technique for lowering the intensity of a recording magnetic field necessary for magnetization reversal by applying a high-frequency magnetic field to a magnetic disk.

Thermal-Assisted Magnetic Recording (TAMR) is an assist recording technique for lowering the intensity of the recording magnetic field necessary for magnetization reversal by heating a magnetic disk.

DETAILED DESCRIPTION

According to one embodiment, there is provided a magnetic disk drive comprising a magnetic disk, a magnetic head configured to read/write data from/to the magnetic disk, a signal processing circuit configured to convert data to be recorded on the magnetic disk into a write signal, and to output the write signal to the magnetic head that generates a recording magnetic field corresponding to the write signal, and a recording control circuit configured to control the signal processing circuit and the magnetic head to record, in a target recording area of the magnetic disk, first data in the target recording area with a recording magnetic field having a first frequency, and to write, second data different from the first data over the first data with a recording magnetic field having a second frequency higher than the first frequency.

Embodiments of the present invention are described with reference to the drawings.

First Embodiment

Hereinafter, a first embodiment is described with reference to the drawings.

Figure 1:
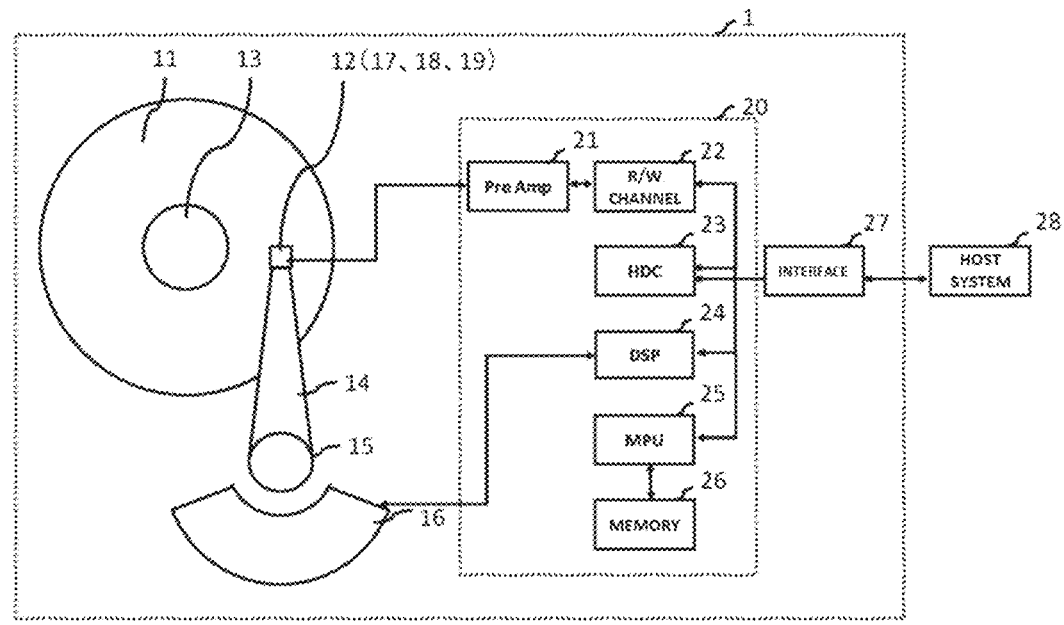
FIG. 1 is a diagram showing a configuration example of a magnetic disk drive according to an embodiment.

A configuration example of a magnetic disk drive 1 of the embodiment is described with reference to FIG. 1. The magnetic disk drive 1 in the embodiment has a high-frequency magnetic field assist function, but any type of assist recording technique may be used as long as it lowers the intensity of the recording magnetic field necessary for magnetization reversal. As shown in FIG. 1, the magnetic disk drive 1 of the present embodiment has a magnetic disk 11 and a magnetic head 12.

The magnetic disk 11 is attached to the rotation shaft of a spindle motor (SPM) 13 and integrally rotates. In the present embodiment, the number of the magnetic disks 11 is described as one for simplicity, but the number of the magnetic disks 11 may be two or more. When two or more magnetic disks 11 are provided, the magnetic disks 11 are attached so as to be stacked at predetermined intervals along the same rotation axis direction of the SPM 13 and rotate together. In the embodiment, the magnetic disk 11 is a magnetic recording medium to which a perpendicular magnetic recording technique is applied, according to which a magnetic field is applied perpendicularly to the surface of the magnetic disk 11.

The magnetic head 12 is mounted on an arm 14. The arm 14 and a voice coil motor (VCM) 16 constitute an actuator. The actuator controls the magnetic head 12 mounted on the arm 14 so as to move in the radial direction of the magnetic disk 11 to a designated track 63, which is to be described later, of the magnetic disk 11 by rotationally driving of the VCM 16 about a rotation shaft 15. A head unit constituted by the magnetic head 12 and the arm 14 is provided above the surface of the magnetic disk 11. Each head unit is managed according to a head number assigned thereto.

When the SPM 13 is rotationally driven and the magnetic disk 11 is rotated, the magnetic head 12 floats from the surface of the facing magnetic disk 11 to a predetermined height and is held at the predetermined height. The magnetic head 12 is moved to any position on the magnetic disk 11 by the rotation of the magnetic disk 11 and the drive of the VCM 16.

The magnetic head 12 includes a read head 17 and a write head 18. The read head 17 is a magnetic head for reproducing (reading) data on the surface of the magnetic disk 11. The write head 18 is a magnetic head for perpendicularly generating a recording magnetic field applied to the surface of the magnetic disk 11 and recording (writing) data on the magnetic disk 11. The write head 18 includes a spin torque oscillator (STO) 19. The STO 19 generates a high frequency magnetic field having a frequency near the resonance frequency of the magnetic layer of the magnetic disk 11 and applies it locally to the magnetic layer of the magnetic disk 11. The magnetic layer of the magnetic disk to which the high frequency magnetic field is applied resonates, and the coercivity (Hc) of the surface of the magnetic disk decreases. Incidentally, in a magnetic disk drive having a heat assist function or an optical assist function instead of the STO 19, it is also possible to reduce the coercivity (Hc) of the surface of the magnetic disk.

The magnetic disk drive 1 includes a control circuit 20 that controls components of the magnetic disk drive 1. The control circuit 20 communicates with a host system 28, such as a personal computer, via an interface 27 provided for the magnetic disk drive 1 to connect to the outside. The control circuit 20 controls components of the magnetic disk drive 1 in response to a command from the host system 28. The components of the magnetic disk drive 1 are the read head 17, the write head 18, and the STO 19, which are provided on the magnetic head 12 and perform read/write operations, the SPM 13 and the VCM 16 that move the position of the magnetic head 12 relative to the magnetic disk, and the like.

The control circuit 20 includes a preamplifier 21, a read/write channel (R/W channel) 22, a hard disk controller (HDC) 23, a digital signal processor (DSP) 24, and a micro processing unit (MPU) 25, and a memory 26.

The preamplifier 21 transmits, to the write head 18, a write signal corresponding to write data supplied from the R/W channel 22. The preamplifier 21 further amplifies a read signal output from the read head 17 and transmits it to the R/W channel 22. The preamplifier 21 includes an STO drive control device that generates a drive signal for driving the STO 19.

The R/W channel 22 is a signal processing circuit and outputs, to the preamplifier 21, a write signal obtained by encoding the write data transferred from the HDC 23. The R/W channel 22 adjusts the write signal, and thereby adjusting the frequency of the recording magnetic field to be applied to the magnetic disk 11. The R/W channel 22 outputs, to the HDC 23, read data obtained by decoding the read signal output from the read head 17.

The HDC 23 communicates with the host system 28 via the interface 27 and controls transmission of read/write data between the magnetic disk drive 1 and the host system 28. The HDC 23 controls the components of the magnetic disk drive 1 in response to a command of the host system 28.

The DSP 24 controls the SPM 13 and the VCM 16 to control the rotation of the magnetic disk 11 and the position of the magnetic head 12. The DSP 24 demodulates servo information obtained from the R/W channel 22 to acquire position information of the magnetic head 12.

The MPU (micro-processing unit) 25 is a main control circuit of the magnetic disk drive 1 that includes a microprocessor. The MPU 25 analyzes a command that the HDC 23 receives from the host system 28, monitors the state of the magnetic disk drive 1, and controls the components of the magnetic disk drive 1. The MPU 25 performs a signal quality inspection of the magnetic disk 11 described below. When determining that the signal quality is deteriorated in the signal quality inspection, the MPU 25 controls the components of the magnetic disk drive 1 so as to record a base-recording data pattern to be described later on the magnetic disk 11 and to write data transmitted from the host system 28 over the base-recording data pattern. The base-recording data pattern is a data pattern recorded in advance in an area where data to be recorded is written. By recording the data to be recorded so as to be superposed on the base-recording data pattern, it is possible to improve the recording quality of the data to be recorded.

The memory 26 is a storage device that functions as an area for storing programs for various processes performed by the MPU 25 and various management information, a buffer area, a cache area, and the like.

Figure 2:
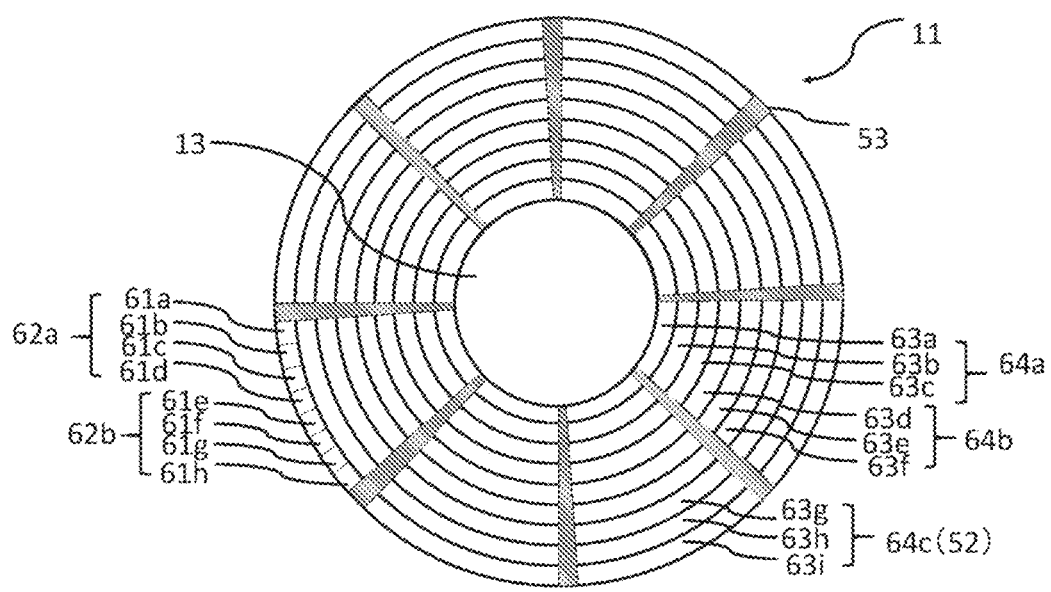
FIG. 2 is a diagram showing a configuration example of a magnetic disk according to an embodiment.

Next, a configuration example of the magnetic disk 11 according to the embodiment is described with reference to FIG. 2.

The magnetic disk 11 is provided with servo areas 53 in which servo information used to position the magnetic head 12 is written. The servo information is, for example, a burst signal. From the amplitude of the signal, the relative positional relation between the center of the tracks 63 and the magnetic head 12 can be calculated. In other words, with the servo information, the position and distance of the magnetic head 12 from the center of the tracks 63 is calculated. FIG. 2 shows, as an example, the servo areas 53 arranged radially.

The magnetic disk 11 is provided with concentric tracks 63 at a predetermined pitch in the radial direction. FIG. 2 shows, as an example, the magnetic disk 11 provided with nine tracks 63a to 63i.

On each track 63, a large number of sectors 61 are continuously formed. FIG. 2 shows a part of the sectors 61 (sectors 61a to 61h) provided in the outermost track 63i. Each sector 61 has a magnetic area in which data can be freely rewritten.

The consecutive sectors 61 are collectively managed as a cluster 62. For example, the sectors 61a to 61d are managed as a cluster 62a, and the sectors 61e to 61h are managed as a cluster 62b.

The adjacent tracks 63 are collectively managed as a zone 64 which is a concentrically divided area. For example, the tracks 63a to 63c are managed as a zone 64a, the tracks 63d to 63f are managed as a zone 64b, and the tracks 63g to 63i are managed as a zone 64c.

The parameters during a read/write operation can be managed in units of clusters 62, in units of tracks 63, in units of zones 64, or in other units.

Next, a functional configuration example of the magnetic disk drive 1 according to each embodiment is described with reference to FIG. 3.

The MPU 25 is programmed with an operating time measuring unit 31. The operating time measuring unit 31 measures the accumulated operating time of the magnetic disk drive 1 and determines whether the time of a quality check interval (Deft T) has elapsed.

The accumulated operating time of Delt_T and a performed recording quality inspection is held in the operating time measuring unit 31 and is referred to when the elapsed time is determined.

The MPU 25 is further programmed with a quality index measuring unit 32. The quality index measuring unit 32 is a quality index measuring circuit that controls the components of the magnetic disk drive 1 so as to record inspection data in an inspection area 52, which is to be described later, in a recording quality inspection, to measure respective signal quality indexes when the assist function of each magnetic head 12 is enabled and disabled, and to record them in a signal quality index area, which is to be described later, of the memory 26. As an example of the signal quality index, an error rate can be used. Here, the error rate means, for example, the rate at which an error occurs in read data. As the signal quality index, any index can be used to determine that the recording quality is deteriorated due to the number of read retries, the resistance value of the element of the STO 19, the overwrite characteristics, the signal/noise ratio (SN ratio), and the deterioration of the assist function.

The MPU 25 is further programmed with an operation comparison unit 33. The operation comparison unit 33 calculates the difference between the signal quality indexes when the assist function of each magnetic head 12 is enabled and disabled and compares the difference with a deterioration threshold, which is to be described later, stored in the memory 26 to determine whether the assist function is deteriorated.

The MPU 25 is further programmed with a recording control unit 34. The recording control unit 34 controls the components of the magnetic disk drive 1 so as to record a base-recording data pattern, which is to be described later with reference to FIG. 4, on the magnetic disk 11 and to write the data transmitted from the host system 28 over base-recording data pattern.

The memory 26 is provided with a recording quality inspection program area 41 for storing a recording quality inspection program for controlling the components in the recording quality inspection. The MPU 25 performs the recording quality inspection in accordance with the recording quality inspection program stored in the memory 26.

The memory 26 is provided with a signal-quality-index deterioration threshold area 42 for storing a signal quality index and a deterioration threshold for each magnetic head 12. The signal quality index and the deterioration threshold are stored in the signal-quality-index deterioration threshold area 42 at each stage of the recording quality inspection and are referred to at each stage of the write operation in the present embodiment to determine the reliability of each magnetic head 12.

The memory 26 is provided with an inspection data area for storing inspection data to be recorded in an inspection area 52, which is to be described later, in the recording quality inspection.

Figure 3:
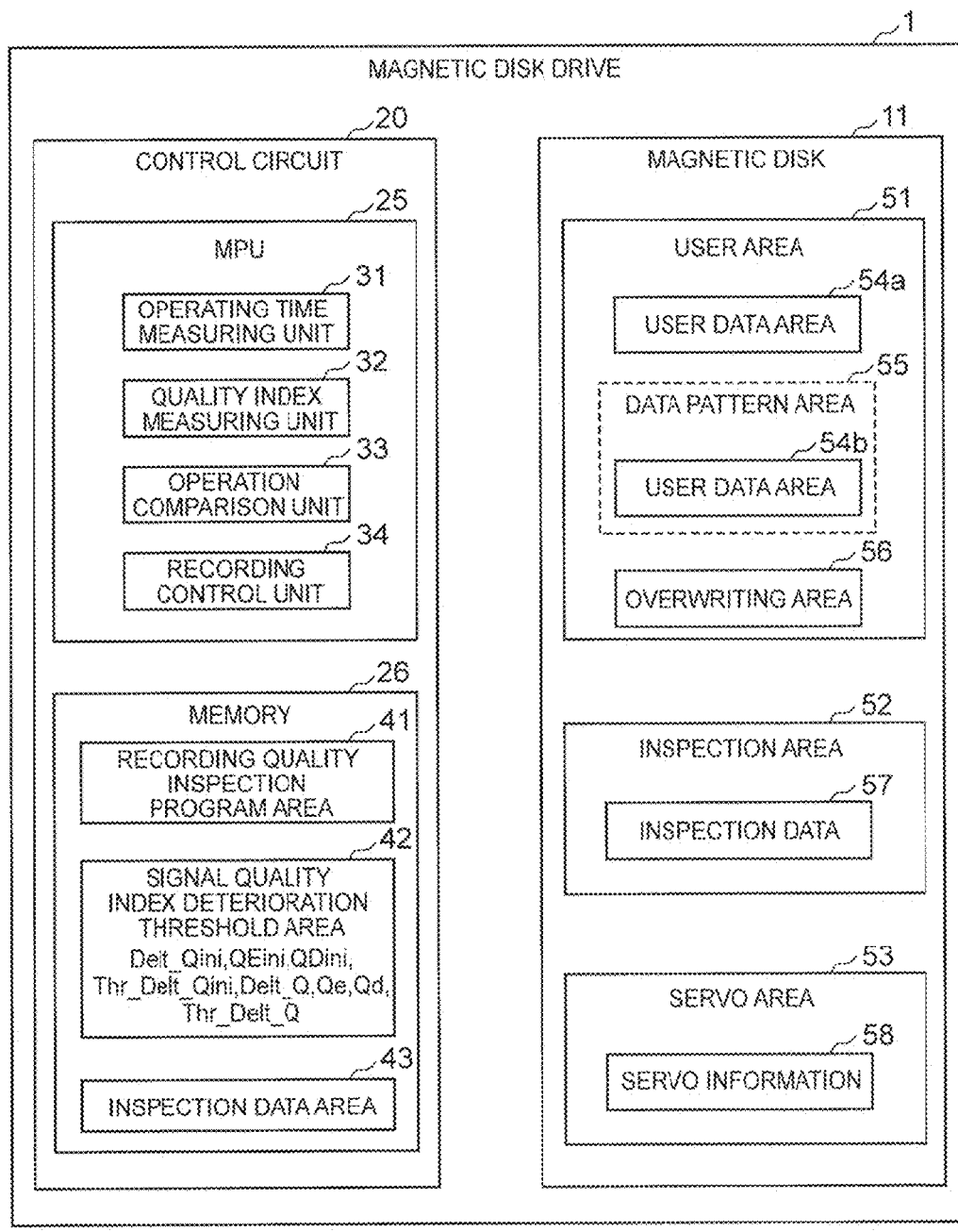
FIG. 3 is a diagram showing a functional configuration example of a magnetic disk drive according to a first embodiment.

As shown in FIG. 3, the magnetic disk 11 is provided with a user area 51, an inspection area 52, and a servo area 53.

A user can record data in the user area 51. The user area 51 may store user data (depicted as user data area 54*a*), a base-recording data pattern (depicted as data pattern area 55), or no data (depicted as an overwriting area 56).

The overwriting area 56 is, in the user area 51, an area that does not store user data or the base-recording data pattern, and can record new data. For example, a sector 61 (e.g., 61*a* to 61*h*) recording data that is not required to be retained is also determined as an overwriting area. The overwriting area 56 may be managed by each cluster 62 (62*a*, 62*b*) or each track 63 (63*a* to 63*i*). In a normal write operation in which data is not written over the base-recording data pattern, the data is directly recorded in the overwriting area 56, and the overwriting area 56 is treated as the user data area 54*a*. On the other hand, in the write operation according to the present embodiment, the base-recording data pattern is recorded in the overwriting area 56, and the user data is recorded over the base-recording data pattern recorded in the overwriting area 56. Thus, the overwriting area 56 recording the base-recording data pattern is treated as the data pattern area 55, and, when the data pattern area 55 is overwritten with user data, the overwriting area 56 is treated as the user data area 54*b*.

A user data area where the user data is written over the base-recording data pattern is denoted by 54*b*, and a user data area where the data is recorded by a normal write operation, in which the data is not written over the base-recording data pattern, is denoted by 54*a*.

The inspection area 52 is an area for recording inspection data to be used during the recording quality inspection. The inspection area 52 is provided, for example, in the outermost zone of the magnetic disk 11, but the arrangement of the inspection area 52 is not limited thereto. In addition, when there is an area where data can be written/erased during the inspection, the inspection area 52 does not need to be provided. For example, when a media cache area for temporarily storing data to be recorded is provided on the magnetic disk 11 of the magnetic disk drive 1, the media cache area may be used as the inspection area 52.

The servo area 53 is an area where servo information used to position the magnetic head 12 is written.

Next, an example of the base-recording data pattern and the data to be written according to the embodiment is described with reference to FIG. 4.

The base-recording data pattern is recorded in the user area 51 of the magnetic disk 11 by the magnetic head 12. The frequency of the recording magnetic field generated by the magnetic head 12 can change from the minimum value to the highest value (highest frequency) for each target recording area (track 63 and zone 64). Here, the frequency of the recording magnetic field is the number of times the direction of the recording magnetic field is reversed per unit time, and the highest frequency of the recording magnetic field set in a certain zone 64 is a frequency at which a 1-bit signal can be recorded in that zone 64. The base-recording data pattern is recorded with a recording magnetic field having a frequency lower than the highest frequency of the recording magnetic field set in the target recording area.

When the frequency of the recording magnetic field generated by the magnetic head 12 becomes high and the rate at which the direction of the recording magnetic field is reversed becomes high, the rate at which the magnetization direction of the magnetic layer of the magnetic disk 11 is reversed becomes high, and the interval at which the magnetization direction of the magnetic layer is reversed becomes short.

In other words, setting the highest frequency in the recording magnetic field in an area of the magnetic disk 11 means that the interval at which the magnetization direction of the magnetic layer is reversed (the shortest magnetization reversal interval) is set at the minimum value for that area of the magnetic disk 11. For example, the shortest magnetization reversal interval set in a recording area is 1 bit long in the recording area. In addition, the shortest magnetization reversal interval of the magnetic layer recording the base-recording data pattern is longer than the shortest magnetization reversal interval set in the target recording area. The shortest magnetization reversal interval is a distance on the same circumferential line connecting two points on the same track 63 in which the magnetization direction is reversed at the shortest interval.

Figure 4A:
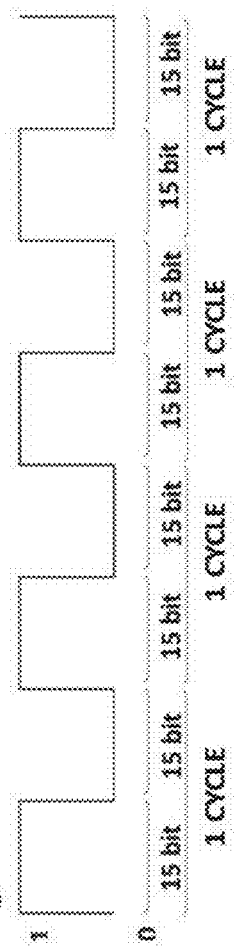
FIGS. 4A to 4C are diagrams showing examples of base-recording data patterns and data to be written according to an embodiment.

The base-recording data pattern is, for example, a pattern in which consecutive signals "0" and "1" having the same length are repeated as shown in FIG. 4A. By simply referring to "pattern", it means that the signals having the same waveform are repeated. FIG. 4A shows an example of a pattern having a 30-bit cycle in which a 15-bit signal "1" and a 15-bit signal "0" are arranged. When the base-recording data pattern shown in FIG. 4A is recorded on the track 63, signals having the same waveform repeatedly appear at an interval of 30 bits in the recorded data. When the base-recording data pattern shown in FIG. 4A is recorded on the track 63, the shortest magnetization reversal interval is 15 bits long.

Figure 4B:
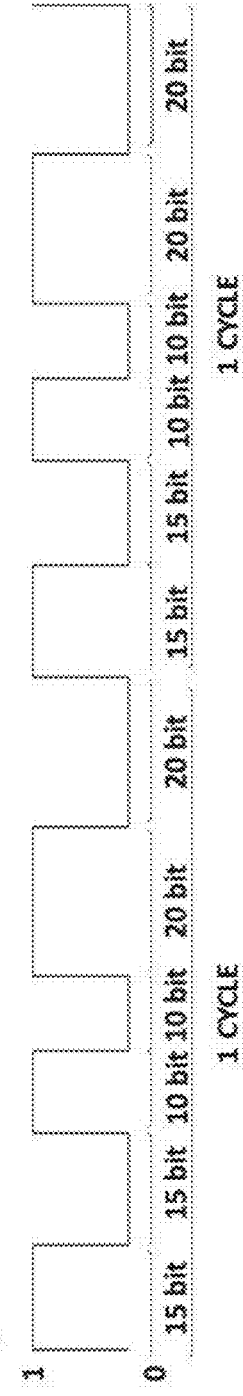

The base-recording data pattern may be, for example, a pattern in which consecutive signals "0" and "1" having different lengths are repeated as shown in FIG. 4B. FIG. 4B shows an example of a pattern having a 80-bit cycle in which alternate signals "1" and "0" having the length of 15 bits, 15 bits, 10 bits, 10 bits, 20 bits, and 20 bits in this order are arranged. When the base-recording data pattern shown in FIG. 4B is recorded on the track 63, signals having the same waveform repeatedly appear at an interval of 80 bits in the recorded data. When the base-recording data pattern shown in FIG. 4B is recorded on the track 63, the shortest magnetization reversal interval is 10 bits long.

Figure 4C:
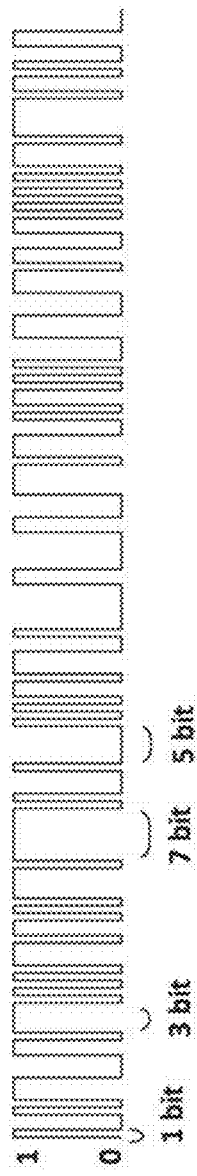

FIG. 4C is an example showing a part of a write signal obtained by converting the data to be written over the base-recording data pattern by the R/W channel 22. As shown in FIG. 4C, the write signal is inverted at various intervals, but the signal is inverted at 1 bit at the shortest interval. When the write data shown in FIG. 4C is recorded on the track 63, the shortest magnetization reversal interval is 1 bit long. As described above, the shortest magnetization reversal interval of the base-recording data pattern is set to be longer than the magnetization reversal interval of the data to written in the area.

Here, it is described that, as an example, a base-recording data pattern is recorded to the magnetic disk drive in which the frequency of the recording magnetic field applied to each target recording sector 61 (each cluster 62 or track 63 may be used instead) is adjusted based on the highest frequency that will be set for the zone to which each sector 61 belongs.

For such a magnetic disk drive, the base-recording data pattern shown in FIG. 4A is, for example, recorded with a recording magnetic field having a frequency of 1/15 of the highest frequency that will be set for the zone 64 to which the target recording sector 61 belongs.

The frequency of the recording magnetic field for recording the base-recording data pattern can be easily set in the zone 64 by setting a fixed value obtained by dividing the highest frequency that will be set for the target recording zone 64 by an integer value. That is, the shortest magnetization reversal interval of the base-recording data pattern is a length of an integral multiple (15 bits long) of the shortest magnetization reversal interval that will be set in the zone 64 (1 bit long).

The frequency of the recording magnetic field for recording the base-recording data pattern can be easily set by dividing the highest frequency of the zone 64 by an integer value, but the frequency of the recording magnetic field may be set by another method.

The recording magnetic field for recording the base-recording data pattern does not need be adjusted based on the highest frequency of the zone 64, and can be adjusted based on the lowest value or the median value of the frequency set in the zone 64. The recording magnetic field for recording the base-recording data pattern may not necessarily be adjusted for each target recording zone. The frequency of the recording magnetic field for recording the base-recording data pattern can be changed for each target recording cluster 62 on the magnetic disk 11 or for each target recording track 63.

When the base-recording data pattern is recorded, the frequency of the recording magnetic field may not be fixed based on the highest frequency of the zone 64, and the frequency may change during the recording. For example, a base-recording data pattern as shown in FIG. 4B can be recorded. In this case, when the base-recording data pattern is recorded, the highest value of the frequency applied to the recording magnetic field is lower than the highest frequency of the zone 64.

The data to be written over the base-recording data pattern on the magnetic disk 11 changes in response to a write command from the host. Thus, in the base-recording data pattern of FIG. 4A or 4B, the number of repetitions of the 30-bit or 80-bit pattern can be changed according to a write command from the host or the data to be recorded indicated by a write command, but the 30-bit or 80-bit pattern itself does not change.

The arrangement of the base-recording data pattern, the intensity of the recording magnetic field for recording the base-recording data pattern, and the frequency of the recording magnetic field are not limited to the above examples, and are designed optimally considering the characteristics of the components of the magnetic disk drive 1, such as the magnetic disk 11 and the magnetic head 12, the data encoding conditions, the degree of deterioration of the assist function, and the like.

Figure 5:
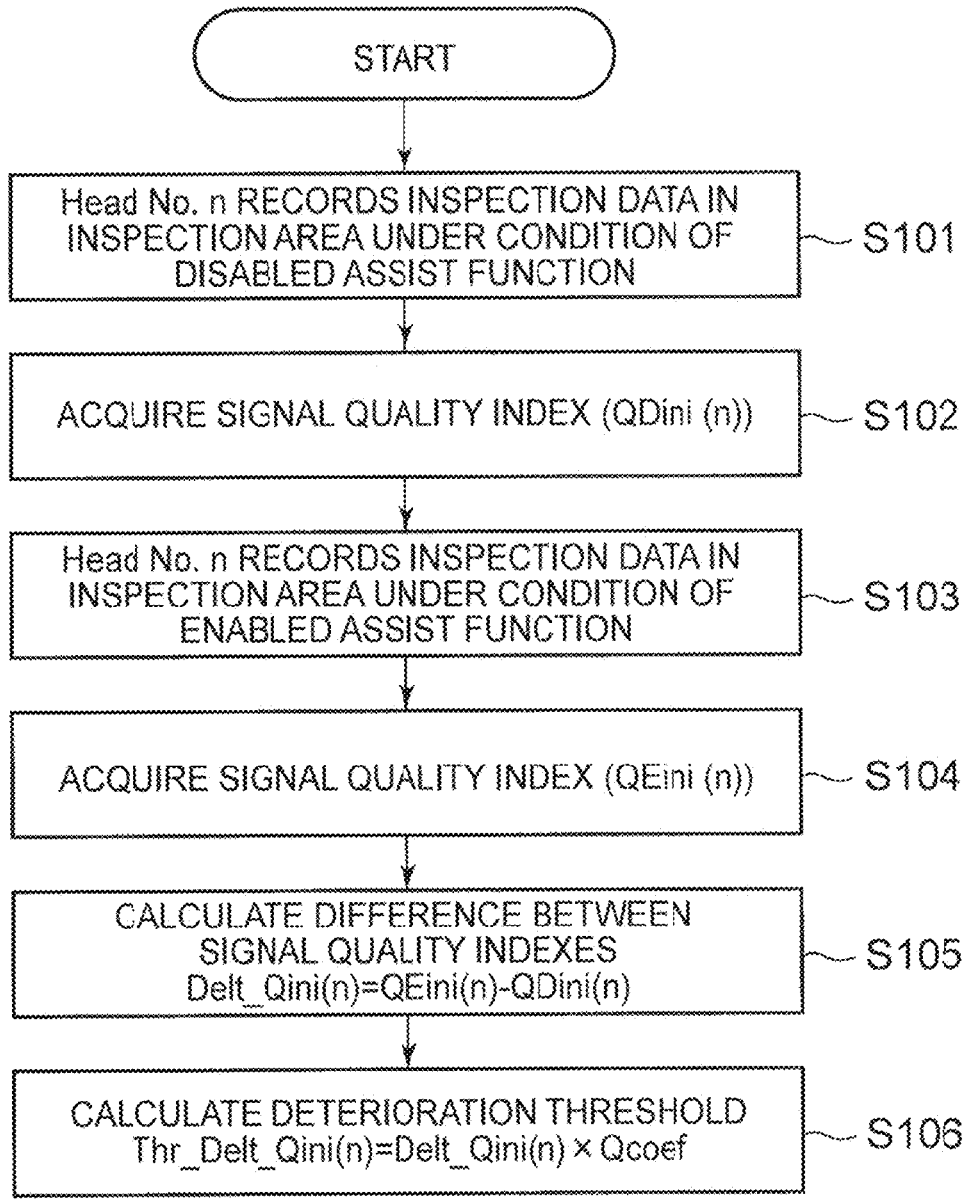
FIG. 5 is a flowchart showing an example of a method for determining a deterioration threshold.

Here, an application example when the function of the STO 19, which is an assist element of the magnetic disk drive 1 having the assist function, is deteriorated, that is, deterioration occurs is described. First, it is necessary to determine whether the assist function is deteriorated, and a method of determining a deterioration threshold (Thr_Delt_Q(n)) is described with reference to FIG. 5. Needless to say, the determination of the degradation of the assist function using the degradation threshold (Thr_Delt_Q(n)) can be applied not only to the STO 19 but also to the heat assist element or the light assist element. FIG. 5 is a flowchart showing an example of a method for determining a deterioration threshold according to the present embodiment. The degradation threshold (Thr_Delt_Q(n)) is determined before the user begins storing data in the magnetic disk drive 1, for example, at the product shipment stage or at the setup stage of the magnetic disk drive 1 in the user environment. Note that, Thr_Delt_Q(n) indicates the deterioration threshold (Thr_Delt_Q(n)) of the magnetic head 12 (Head No. n) having the magnetic head management number n. Hereinafter, the notation (n) indicates a value obtained from Head No. n. Here, when data can be recorded on both sides of the magnetic disk 11 and one magnetic disk 11 is mounted in the magnetic disk drive 1, n is, for example, 1 or 2. This is not applicable in the case where a plurality of heads capable of reading and writing data from/to one surface of the magnetic disk 11 is mounted.

In step S101, the quality index measuring unit 32 controls the components of the magnetic disk drive 1 so as to acquire the inspection data recorded in the inspection data area 43 and so that the Head No. n records the inspection data in the inspection area 52 while the assist function is disabled.

In step S102, the signal quality index (QDini(n)) when the assist function is disabled is measured and recorded in the signal-quality-index deterioration threshold area 42 of the memory 26. When an error rate is used as the signal quality index, the Head No. n reproduces the inspection data recorded in the inspection area 52, and the preamplifier 21 amplifies the reproduced signal Then, the R/W channel 22 outputs the output read signal as the decoded read data, and the quality index measuring unit 32 calculates the rate at which an error occurs in the read data. The quality index measuring unit 32 records the calculated error rate in the signal-quality-index deterioration threshold area 42 of the memory 26. In step S102, the number of read retries, the element resistance value of the STO 19, and the signal/noise ratio are measured according to the type of the signal quality index used for the inspection.

In step S103, the quality index measuring unit 32 controls the components of the magnetic disk drive 1 so that the Head No. n records the inspection data acquired from the inspection data area 43 of the memory 26 in the inspection area 52 while the assist function is enabled. The inspection data may be recorded in steps S101 and S103 at the same position on the magnetic disk 11 or different positions.

In step S104, the signal quality index (QEini(n)) when the assist function is enabled is measured similarly to step S102 and is recorded in the signal-quality-index deterioration threshold area 42 of the memory 26.

In step S105, the operation comparison unit 33 calculates the difference (Delt_Qini(n)) between the signal quality index (QDini(n)) when the assist function is disabled obtained in step S102 and held in the signal-quality-index deterioration threshold area 42, and the signal quality index (QEini(n)) when the obtained assist function is enabled obtained in step S104. The value of Delt_Qini(n) is calculated by the following equation.

$$\text{Delt\_Qini}(n) = \text{QEini}(n) - \text{QDini}(n)$$

In step S106, the operation comparison unit 33 multiplies Delt_Qini(n) obtained in step S205 by a predetermined deterioration coefficient (Qcoef) to calculate a deterioration threshold (Thr_Delt_Qini(n)). Thr_Delt_Qini(n) is calculated by the following equation. Note that, Qcoef is a value that satisfies 0<Qcoef<1.

$$\text{Thr\_Delt\_Qini}(n) = \text{Delt\_Qini}(n) \times \text{Qcoef}$$

Thr_Delt_Qini is calculated for each magnetic head 12. The calculated Thr_Delt_Qini is held in the signal-quality-index deterioration threshold area 42 of the memory 26 and is referred to in the recording quality inspection.

The deterioration threshold may be calculated using the average value or median value obtained by measuring the deterioration threshold or signal quality index obtained in each step a plurality of times. In addition, the deterioration threshold may not be calculated in this manner but be set to any value.

Next, the arrangement of data recorded on the magnetic disk 11 at each stage of the write operation in the first embodiment is described with reference to FIGS. 6A to 6C.

Figure 6A:
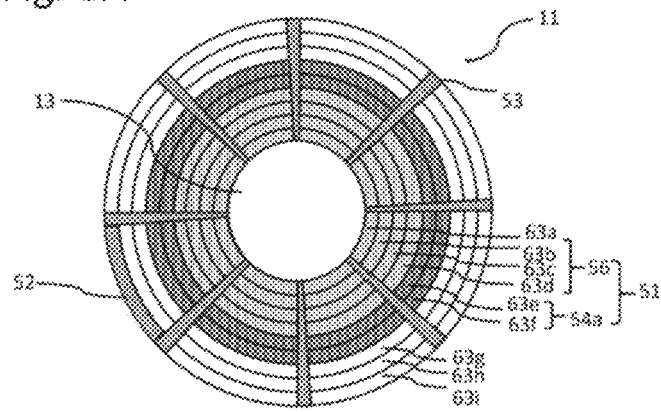
FIGS. 6A to 6C are diagrams showing arrangement examples of data stored on a magnetic disk at each stage of a write operation.

FIG. 6A shows an arrangement example of data recorded on the magnetic disk 11 before the write operation. FIG. 6A shows that, as an example, the overwriting area 56 is arranged on the tracks 63a to 63d, the user data area 54 is arranged on the tracks 63e and 63f, and the inspection area 52 is arranged on the outermost track 63i.

Figure 6B:
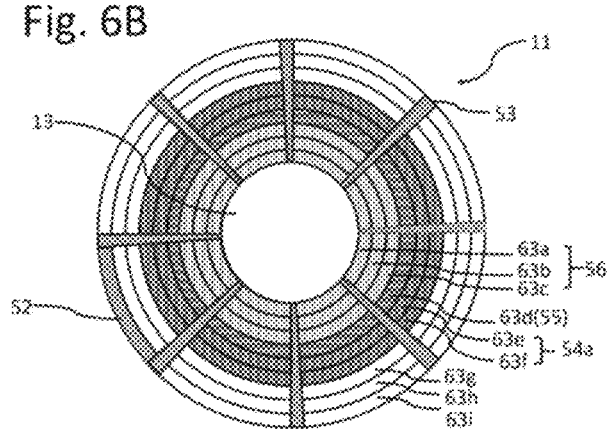

FIG. 6B shows an arrangement example of data recorded on the magnetic disk 11 when the base-recording data pattern is recorded on the track 63d of FIG. 6A. The track 63d is changed from the overwriting area 56 to the data pattern area 55 by overwriting the base-recording data pattern.

Figure 6C:
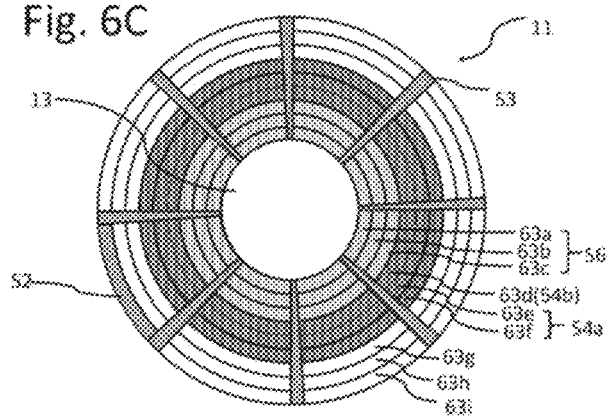

FIG. 6C shows an arrangement example of data stored on the magnetic disk 11 when data is recorded on the track 63d recording the base-recording data pattern of FIG. 6B. The track 63d changes from the data pattern area 55 to the user data area 54 by writing the data.

The operation of the magnetic disk drive 1 in data recording according to the first embodiment is described with reference to FIG. 7.

Figure 7:
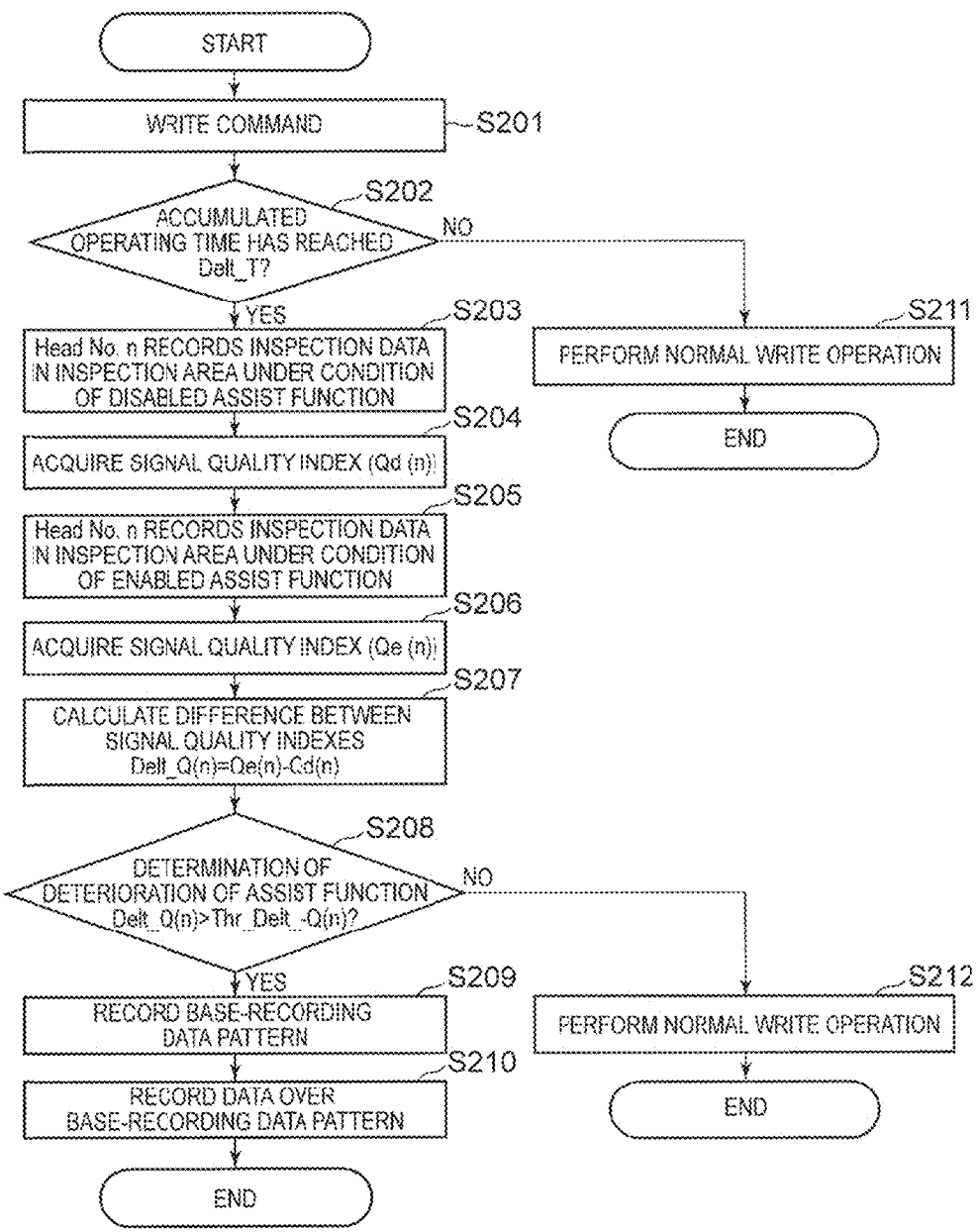
FIG. 7 is a flowchart showing an example of a write operation of the magnetic disk drive according to the first embodiment.

FIG. 7 is a flowchart showing an example of a write operation, which is an operation of the magnetic disk drive 1 according to the first embodiment in data recording. First, this operation is described using an example of a recording operation of an HDD having an assist function. Here, a normal write operation is described as an operation using an assist recording function. The recording quality inspection for checking the deterioration of the assist function of the magnetic head 12 is performed in each step from steps S201 to S208 in FIG. 7.

In step S201, the host system 28 instructs the magnetic disk drive 1 to record data on the magnetic disk 11 through the interface 27 and the HDC 23. The HDC 23 transmits a write command from the host system 28 to the MPU 25. The MPU 25 loads the recording quality inspection program recorded in the memory 26 and starts the recording quality inspection.

In step S202, the operating time measuring unit 31 acquires the accumulated operating time of the magnetic disk drive 1 and determines whether the time of the quality check interval (Delt_T) has elapsed from the previous recording quality inspection. For example, by setting the quality check interval (Delt_T) to one hour and referring to the operating time of the magnetic disk drive, the recording quality inspection can be performed every hour. The timing for performing the recording quality inspection is not limited to every hour. When the time of Delt_T is determined not to have elapsed in step S202, the process proceeds to step S211. When the time of Delt_T is determined to have elapsed in step S202, the process proceeds to step S203.

In step S211, the Head No. n performs a normal write operation for recording the data transmitted from the host system 28 in a designated area using the assist function and terminates the operation.

In step S203, the quality index measuring unit 32 controls the components of the magnetic disk drive 1 so as to acquire the inspection data recorded in the inspection data area 43 and so that the Head No. n records the inspection data in the inspection area 52 under the condition that the assist function is disabled. The inspection data is recorded at exactly the same position on the magnetic disk 11 in steps S101 and S203. In step S203, recording is performed under the same conditions as step S101.

In step S204, the signal quality index (Qd(n)) when the assist function is disabled is measured and recorded in the signal-quality-index deterioration threshold area 42 of the memory 26. The method for acquiring the signal quality index is similar to step S102.

When an error rate is used as the signal quality index, the Head No. n reproduces the inspection data recorded in the inspection area 52, the preamplifier 21 amplifies the reproduced signal, the R/W channel 22 outputs the output read signal as the decoded read data, the quality index measuring unit 32 calculates the rate at which an error occurs in the read data. The quality index measuring unit 32 records the calculated error rate in the signal-quality-index deterioration threshold area 42 of the memory 26.

In step S205, the quality index measuring unit 32 controls the components of the magnetic disk drive 1 so that the Head No. n records, in the inspection area 52, the inspection data acquired from the inspection data area 43 of the memory 26 while the assist function is enabled. The inspection data is recorded at the same position on the magnetic disk 11 in steps S103 and S205. Step S205 is different from step S203 in that the STO 19 is driven through the STO drive control device of the preamplifier 21 and a high frequency magnetic field is applied together with the recording magnetic field.

In step S206, the signal quality index (Qe(n)) written in the inspection area 52 when the assist function is enabled is measured and recorded in the signal-quality-index deterioration threshold area 42 of the memory 26. The method for acquiring the signal quality index is similar to step S204.

In step S207, the operation comparison unit 33 calculates the difference (Delt_Q(n)) between the signal quality index (Qd(n)) when the assist function is disabled obtained in step S204 and held in the signal-quality-index deterioration threshold area 42, and the signal quality index (Qe(n)) when the obtained assist function is enabled obtained in step S206. Delt_Q(n) is calculated by the following equation.

$$\text{Delt\_}Q(n)=Qe(n)-Qd(n)$$

In step S208, the operation comparison unit 33 compares the difference (Delt_Q(n)) between the signal quality indexes obtained in step S207 with the deterioration threshold (Thr_Delt_Qini(n)) held in the signal-quality-index deterioration threshold area 42 to determine whether assist function of Head No. n is deteriorated. The characteristic deterioration of the STO element and the deterioration of the STO drive control device provided in the preamplifier 21 are also determined as the deterioration of the assist function of the Head No. n. When Delt_Q(n)<Thr_Delt_Q(n) is satisfied in step S208, the assist function of Head No. n is determined not to be deteriorated, and the process proceeds to step S212. When Delt_Q(n)>Thr_Delt_Q(n) is satisfied in step S208, the assist function of the Head No. n is determined to be deteriorated, and the process proceeds to step S209. The relation between the magnitude of Delt_Q(n) and Thr_Delt_Q(n) and the determination of the deterioration of the assist function is set reversely according to the type of the used signal quality index.

In step S212, the Head No. n performs a normal write operation for recording the data in a designated area of the magnetic disk 11 and terminates the operation.

In step S209, the recording control unit 34 controls the components of the magnetic disk drive 1 so that the Head No. n records the base-recording data pattern in the area of the magnetic disk 11 for recording data.

In step S210, the recording control unit 34 controls the components of the magnetic disk drive 1 so that the Head No. n writes the data over the base-recording data pattern recorded on the magnetic disk 11. By recording the data over the base-recording data pattern, the recording quality of the data recorded by the magnetic head 12 having the deteriorated assist function is improved.

In step S208, when it is determined that Delt_Q(n)>Thr_Delt_Q(n) is satisfied for one magnetic head 12, the process for all the magnetic heads 12 may proceed to step S209, and all the magnetic heads 12 may record the respective base-recording data patterns in the areas for recording the data.

If the magnetic disk drive 1 has a Self-Monitoring Analysis and Reporting Technology (SMART) for measuring a resistance value or an error rate in order to ensure reliability of each magnetic head 12, the recording quality inspection may be performed simultaneously with these measurements.

Note that, the above-mentioned recording quality inspection may be performed before shipment of the magnetic disk drive 1, that is, at the time of manufacture.

The inspection area 52 for inspecting the recording characteristics is provided on the magnetic disk 11 of the magnetic disk drive 1 using the assist recording method. At a time before the assist function is deteriorated, for example, at the time of manufacture, the inspection data is recorded in the inspection area 52, and the signal quality indexes when the assist function is enabled and disabled are measured. The deterioration threshold (Thr_Delt_Q) of each magnetic head 12 is determined based on the signal quality index. The deterioration threshold is distinguished for each magnetic head 12 and is recorded in the signal-quality-index deterioration threshold area 42 of the memory 26.

Each time the accumulated operating time of the magnetic disk drive 1 increases by a predetermined time (Delt_T), the recording quality inspection is performed for each magnetic head 12. In the recording quality inspection, inspection data is recorded in the inspection area 52 by each magnetic head 12 and the signal quality index is measured. The operation comparison unit 33 calculates the difference (Delt_Q) between the signal quality indexes based on the measured signal quality indexes.

When the difference between the signal quality indexes (Delt_Q) is larger than the predetermined degradation threshold (Thr_Delt_Q), the operation comparison unit 33 determines that the assist function of the magnetic head 12 is deteriorated. When the assist function is determined to be deteriorated, the base-recording data pattern is recorded, and the data is written over the base-recording data pattern.

When the difference between the signal quality indexes (Delt_Q) is less than the degradation threshold (Thr_Delt_Q), the operation comparison unit 33 determines that the assist function of the magnetic head 12 is not deteriorated. When the assist function is determined not to be deteriorated, the data is recorded in the designated area of the magnetic disk 11, and a normal write operation is performed.

Figure 8:
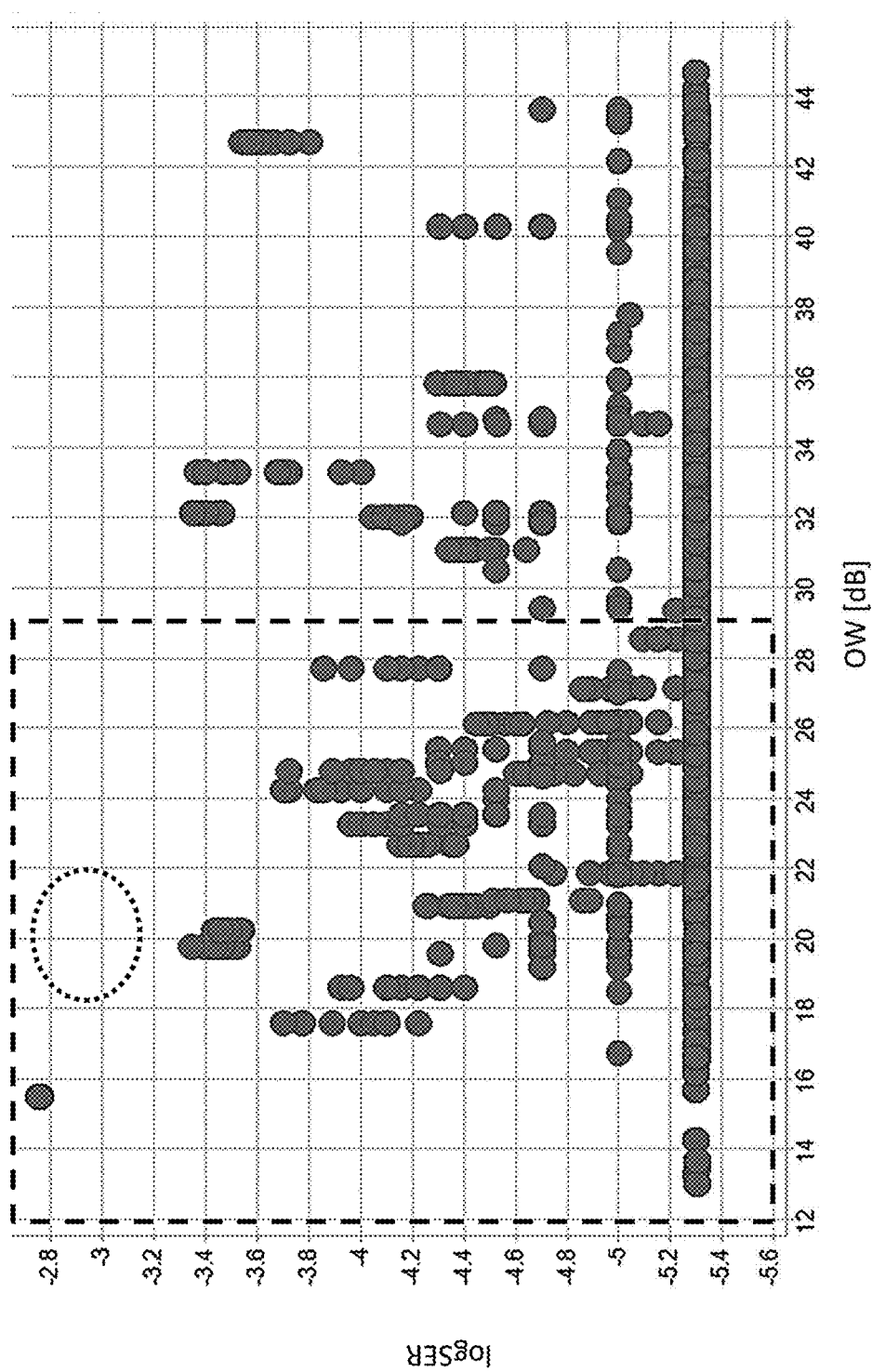
FIG. 8 is a diagram showing the relation between an error rate and overwrite characteristics according to an embodiment.
Figure 9:
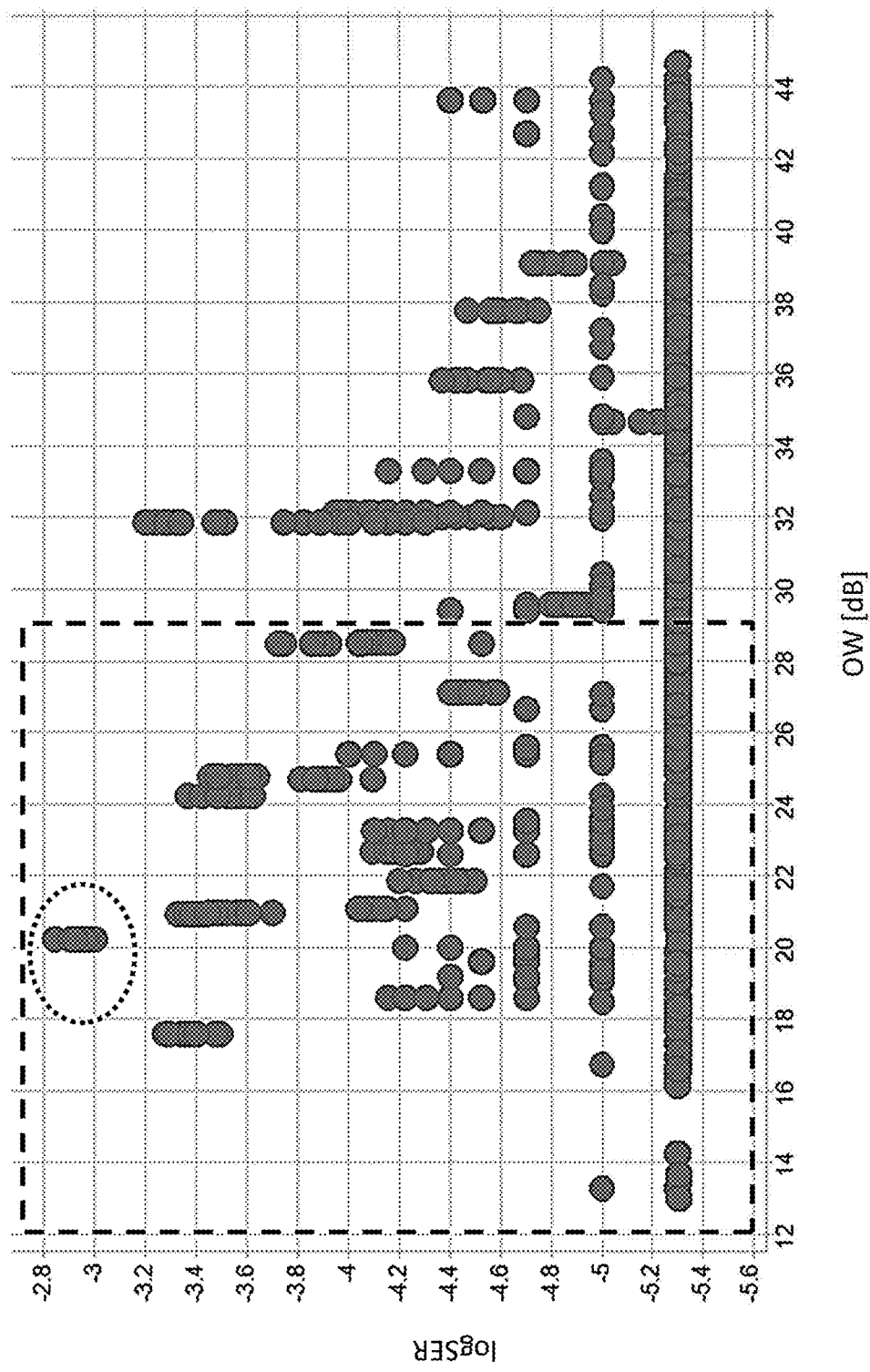
FIG. 9 is a diagram showing the relation between an error rate and overwrite characteristics of a comparative example.

The effect of the recording quality improvement due to the base-recording data pattern recorded before data recording is described with reference to FIGS. 8 and 9. FIG. 8 is a scatter diagram when the magnetic disk drive 1 in the present embodiment records data. In the diagram, logarithmic values of the sector error rate (SER) are plotted on the vertical axis, and the values of the overwrite characteristics (OW) are plotted on the horizontal axis. FIG. 9 is a scatter diagram when the magnetic disk drive in a comparative example records data. In the diagram, the logarithmic values of the SER are plotted on the vertical axis, and the values of the OW are plotted on the horizontal axis.

Here, the OW is an index indicating the recording performance expressed as dB, which indicates the degree of erasure residue of an old signal when a new signal is written over the old signal. The OW can be used to determine the writing difficulty of the magnetic disk 11, the writing capability of the magnetic head 12, and the like. The OW changes with the frequency of the recording magnetic field and the write current. Since the erasure residue of a signal can cause an error, there is a correlation that the SER increases as the OW decreases. The SER is one of error rates obtained by recording/reproducing data on/from the magnetic disk 11 and dividing the number of sectors 61 in which an error has occurred by the number of reproducing sectors 61. In order to determine whether an error occurs in units of sectors 61, the sector 61 having a 1-bite error is determined to be error. As the value of the SER is lower, the recording quality of the magnetic disk drive is higher.

The OW and the SER were measured ten times under the respective conditions that the write current (Iw) was changed and that the overshoot (OSA) of the write current was changed. The Iw indicating a steady-state value of the write current was set to, for example, 40 mA as a measurement condition. The overshoot generally means a phenomenon in which a waveform exceeds a steady-state value at a rising part of a rectangular wave (square wave) or a part of a protruding waveform. The OSA indicating the difference between the highest value of the write current and the steady-state value of the write current shown at a rising was set to, for example, 40 mA as a measurement condition.

In the embodiment, the data to be the base (old signal) was recorded, and a base-recording data pattern was written over the data to be the base at a frequency of $1/15$ of the highest frequency of the recording magnetic field applied to the target recording zone. Then, the SER and the OW when overwriting data (new signal) was written in the area recording the base-recording data pattern were plotted in the scatter diagram of FIG. 8.

In the comparative example, the SER and the OW when the base data (old signal) was recorded and an overwriting pattern (new signal) was written over the base data were plotted in the scatter diagram of FIG. 9.

When the assist function of the magnetic disk drive 1 is deteriorated, the write capability is reduced. When the write capability is reduced, the erasure residue of the old data increases when new data is recorded over the old data recorded on the magnetic disk 11, that is, the OW decreases, and the SER increases.

In the scatter diagrams of FIGS. 8 and 9, the OW has values of about 13 dB to 45 dB. In the scatter diagrams of FIGS. 8 and 9, a point with a low OW value (a portion with the OW of 13 dB to 29 dB surrounded by a broken-line square), which means that the assistant function is deteriorated, is focused.

FIG. 9 shows that the points at which the OW is low and the SER is high are concentrated in the vicinity of OW=20 dB and log SER=−2.8 (portion enclosed by the broken-line ellipse). On the other hand, FIG. 8 shows that the points at which the OW is low and the SER is high are concentrated in the vicinity of log SER=−3.3 and OW=20 dB. In FIG. 8, the point with the high SER surrounded by the broken-line ellipse shown in FIG. 9 disappears. Comparing the SER in the embodiment with the SER in the comparative example, when the OW has low values (around OW=20 dB), the SER is improved by recording the base-recording data pattern and, then, writing the data over the base-recording data pattern.

As described above, by recording the base-recording data pattern having a low recording frequency on the magnetic disk 11 and, then, writing data having a recording frequency higher than that over the base-recording data pattern, it is possible to improve the recording quality of the magnetic disk drive 1. In the perpendicular magnetic recording magnetic disk 11, the substantial coercivity of an area of the magnetic layer of the magnetic disk 11 is changed by the magnetic field received from the adjacent area. The coercivity of the target recording area of the magnetic disk 11 in the present embodiment becomes smaller by recording the base-recording data pattern used for base recording. The reduction of the coercivity of the target recording area makes the reversal of the magnetization of the magnetic layer easy, and the recording quality is improved.

Additionally, when the OW is lowered as the assist function is deteriorated, by recording the base-recording data pattern having a low recording frequency on the magnetic disk 11 and, then, writing data having a recording frequency higher than that over the base-recording data pattern, it is possible to maintain the recording quality of the magnetic disk drive 1.

As described above, the magnetic disk drive in the first embodiment refers to the accumulated operating time of the magnetic disk drive 1 before the write operation, and performs recording quality inspection for deterioration of the assist function of the magnetic head 12 when a predetermined time has elapsed from the previous recording quality inspection. It is possible for the magnetic disk drive in the present embodiment to detect the deterioration of the assist function of the magnetic head 12 by comparing the difference (Delt_Q) between the signal quality indexes when the assist function of the magnetic head is enabled and disabled, with the deterioration threshold (Thr_Delt_Q) calculated from the signal quality index before the assist function is deteriorated.

In addition, when deterioration of the assist function is detected, the base-recording data pattern is recorded in the area for recording the data. By writing the data to be recorded over the base-recording data pattern, the recording quality of the data recorded by the magnetic head 12 having the deteriorated assist function is improved. The arrangement of the base-recording data pattern, the intensity of the recording magnetic field for recording the base-recording data pattern, and the frequency of the recording magnetic field are not limited to the above examples, and may be designed optimally considering the characteristics of the components of the magnetic disk drive 1, such as the magnetic disk 11 and the magnetic head 12, the data encoding conditions, the degree of deterioration of the assist function, and the like.

Second Embodiment

A magnetic disk drive 1 in a second embodiment is described.

Descriptions for the configurations, functions, operations and the like equivalent to those of the first embodiment are omitted.

In the second embodiment, recording quality inspection is performed when the magnetic head is not reading/writing data from/to the magnetic disk. When the assist function of the magnetic head 12 is determined to be deteriorated in the recording quality inspection, the recording quality inspection of the magnetic head 12 is not performed thereafter. In addition, when the assist function is determined to be deteriorated in the signal quality inspection and the magnetic head 12 is to record data, a base-recording data pattern is recorded first, and the data is written over the base-recording data pattern.

Figure 10:
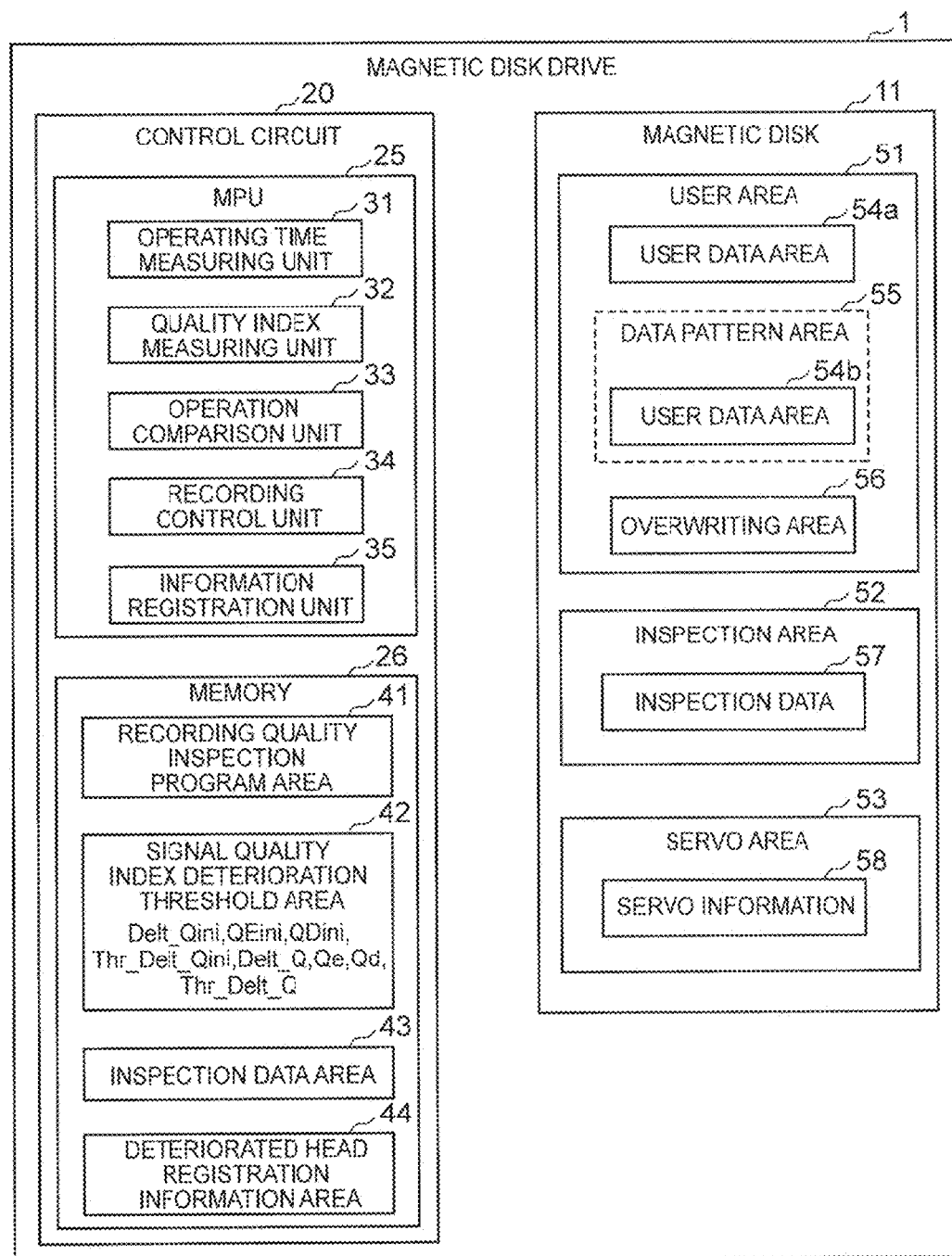
FIG. 10 is a diagram showing a functional configuration example of a magnetic disk drive according to a second embodiment.

In the second embodiment, an information registration unit 35 shown in FIG. 10, which is implemented by programming MPU 25, is provided in addition to the configuration in the first embodiment shown in FIG. 3. When the assist function of the magnetic head 12 is deteriorated, the information registration unit 35 of the MPU 25 registers information indicating the magnetic head as a deteriorated head in a deteriorated head registration information area 44 of the memory 26. The recording quality inspection of the magnetic head 12 registered as the deteriorated head is not performed. The information registration unit 35 determines whether each magnetic head 12 is registered as a deteriorated head.

The deterioration threshold determination method in the second embodiment is similar to that in the first embodiment.

Figure 11:
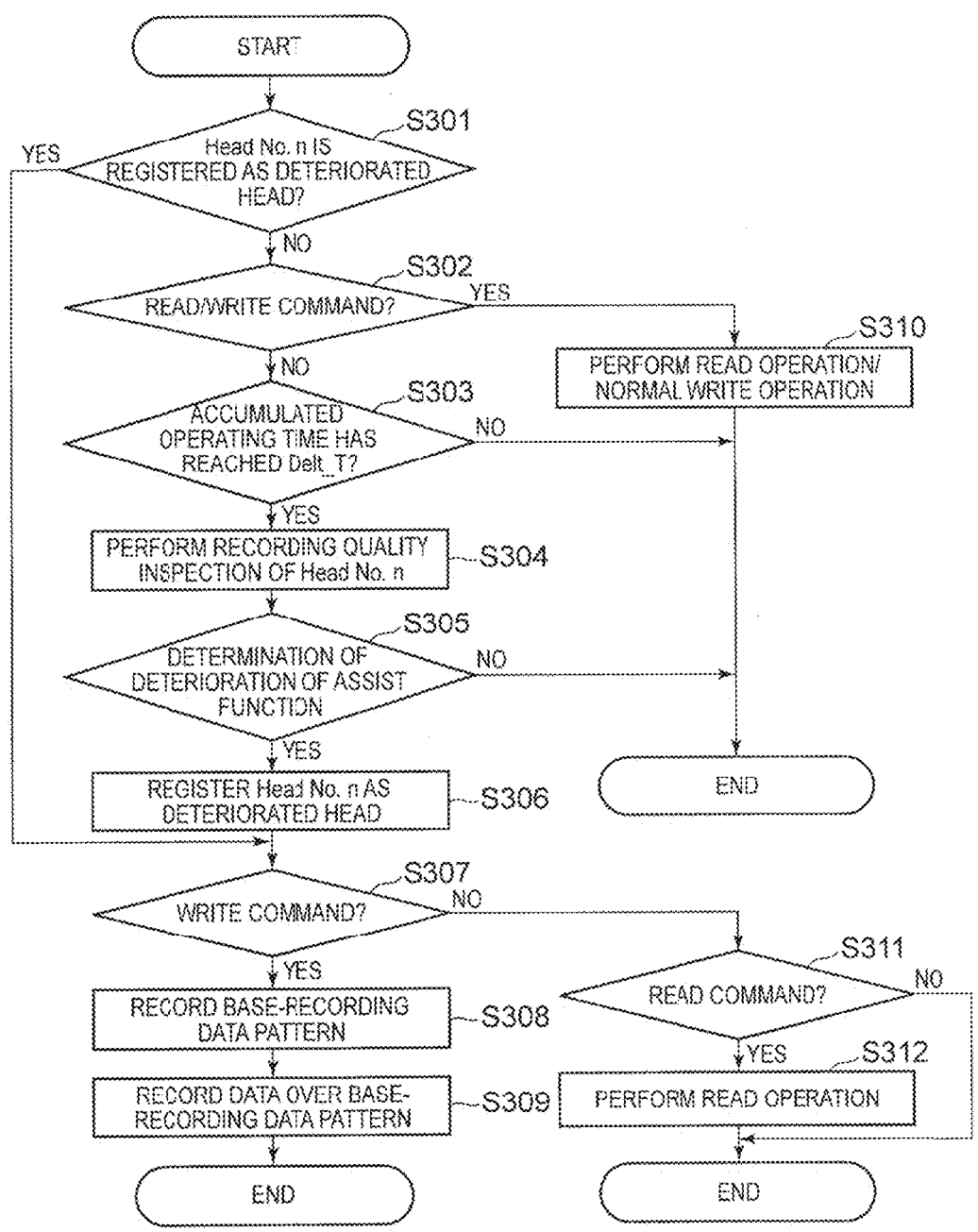
FIG. 11 is a flowchart showing an example of a write operation of the magnetic disk drive according to the second embodiment.

A write operation of the magnetic disk drive 1 in the second embodiment is described with reference to FIG. 11.

In step S301, the information registration unit 35 determines whether the assist function is deteriorated based on whether the Head No. n is registered as a deteriorated head. When the deteriorated head registration information area 44 stores the deteriorated head registration information, the Head No. n is determined to be registered as a deteriorated head. When the Head No. n is not registered as a deteriorated head, the process proceeds to step S302. When the Head No. n is registered as the deteriorated head, the process proceeds to step S307.

In step S302, the MPU 25 determines whether a read/write operation command using the Head No. n is issued to the magnetic disk drive 1. In step S301, not only the read/write operation but also the maintenance operation and the like may be considered. When a read/write operation command is issued in step S302, the process proceeds to step S310, and the Head No. n performs a normal read/write process and terminates the operation. When a read/write operation command is not issued in step S302, the process proceeds to step S303.

In step S303, the operating time measuring unit 31 determines whether the accumulated operating time of the magnetic disk drive 1 has reached the quality check interval (Delt_T). When the time of Delt_T is determined not to have elapsed in step S303, the operation is terminated. When the time of Delt_T is determined to have elapsed in step S303, the process proceeds to step S304.

In step S304, a similar inspection to the recording quality inspection in steps S203 to S207 in the first embodiment is performed. That is, the inspection data is recorded in the inspection area 52 by the Head No. n whose assist function is disabled/enabled, the signal quality indexes when the assist function is disabled/enabled are measured, and the difference (Delt_Q(n)) between the signal quality indexes is calculated.

In step S305, it is determined whether the assist function of the Head No. n is deteriorated similarly to step S208. The operation comparison unit 33 compares the difference (Delt_Q(n)) between the signal quality indexes obtained in step S304 with the deterioration threshold (Thr_Delt_Qini (n)) held in the signal-quality-index deterioration threshold area 42 to determines whether assist function is deteriorated. When the operation comparison unit 33 determines that the assist function of the Head No. n is not deteriorated (Delt_Q (n)<Thr_Delt_Q(n)) in step S305, the operation is terminated. When the operation comparison unit 33 determines that the assist function of the Head No. n is deteriorated (Delt_Q(n)>Thr_Delt_Q(n)) in step S305, the process proceeds to step S306.

In step S306, the information registration unit 35 registers the Head No. n determined in step S305 that the assist function is deteriorated as a deteriorated head, and stores the information in the deteriorated head registration information area 44.

In step S307, when a write command to record data on the magnetic disk 11 is issued from the host system 28 to the magnetic disk drive 1 through the interface 27 and the HDC 23, the process proceeds to step S308. When no write command is issued in step S307, the process proceeds to step S311.

In step S308, under the instruction of the recording control unit 34, the Head No. n records the base-recording data pattern on the magnetic disk 11, and the process proceeds to step S309. The operation in step S308 is similar to that in step S209.

In step S309, under the instruction of the recording control unit 34, the Head No. n writes the data over the base-recording data pattern, and the operation is terminated. By recording the data over the base-recording data pattern, the recording quality of the data recorded by the magnetic head 12 having the deteriorated assist function is improved.

When a read command is issued to the magnetic disk drive 1 in step S311, the process proceeds to step S312, and the Head No. n performs a read operation and terminates the operation. In step S311, when no read command is issued, the operation is terminated.

In the second embodiment, by performing the recording quality inspection while the magnetic head 12 is not reading/writing data from/to the magnetic disk 11, the recording quality inspection is not performed before the writing operation and which shortens the time required to a series of data writing.

In addition, once the assist function is determined to be deteriorated in the recording quality inspection, the recording quality inspection is not performed thereafter. In the write operation after the assist function is determined to be deteriorated, the base-recording data pattern is recorded on the magnetic disk 11, and the data is written over the base-recording data pattern.

Thus, after the deterioration of the assist function is detected, unnecessary recording quality inspection can be omitted. In the second embodiment, by recording data over the base-recording data pattern similarly to the first embodiment, it is possible to improve the recording quality of the data recorded by the magnetic head 12 having the deteriorated function.

Third Embodiment

A magnetic disk drive 1 of a third embodiment is described.

Descriptions of the functions, configurations, operations, and the like equivalent to those of the first and second embodiments are omitted.

In a base-recording data pattern, although the number of times the pattern is repeated can change depending on the content of a write command from the host, the pattern itself does not change. Thus, it is possible to record the base-recording data pattern on the magnetic disk 11 before a write command is received. In the third embodiment, when the assist function is determined to be deteriorated in the recording quality inspection, the base-recording data pattern is recorded in the overwriting area 56 when a read/write operation command is not issued.

Figure 12:
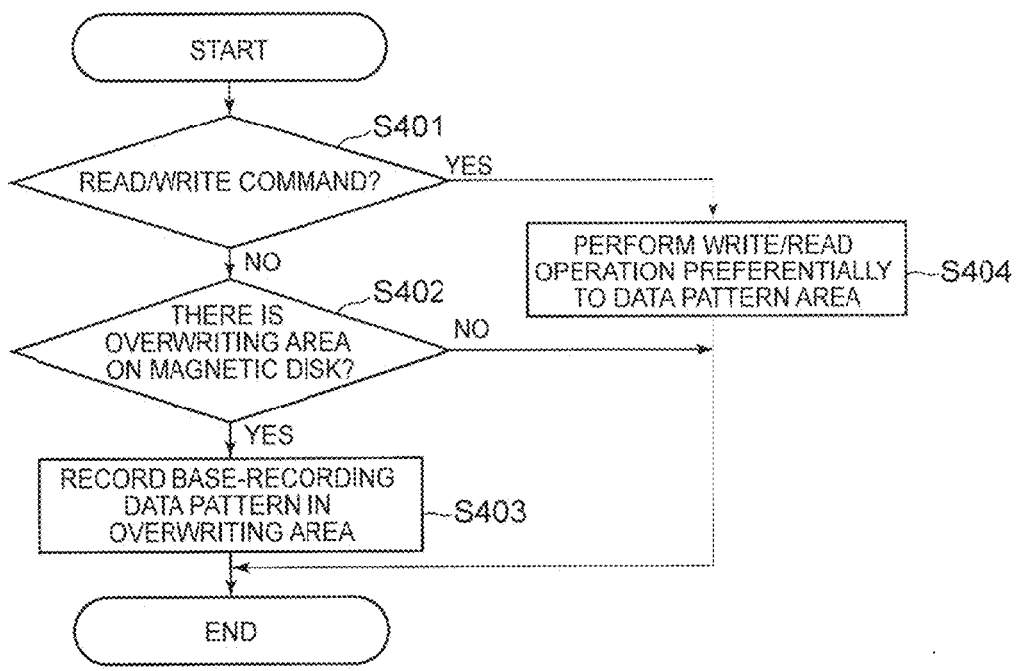
FIG. 12 is a flowchart showing an example of a write operation of a magnetic disk drive according to a third embodiment.

The write operation of the magnetic disk drive 1 in the third embodiment when the assist function of Head No. n is determined to be deteriorated is described with reference to FIG. 12. The method for determining the deterioration of the assist function and the operation of the magnetic disk drive 1 when the assist function is determined not to be deteriorated are similar to those in the first or second embodiment, and the descriptions thereof are omitted.

In step S401, the MPU 25 determines whether a read/write operation command using the Head No. n is issued to the magnetic disk drive 1. In step S401, not only the read/write operation but also the maintenance operation and the like may be considered.

When a read/write operation command is not issued in step S401, the process proceeds to step S402. In step S402, the MPU 25 determines whether there is, in the user area 51, a new overwriting area 56 where the data to be held and the base-recording data pattern are not recorded and data can be newly recorded. For example, the MPU 25 determines, as an overwriting area 56, a sector 61 recording some data that is managed as unnecessary data. The overwriting area 56 may be managed in units of each cluster 62 or each track 63. When there is no overwriting area 56 in step S402, the operation is terminated. When there is an overwriting area 56 in step S402, the process proceeds to step S403.

In step S403, a base-recording data pattern is recorded in the overwriting area 56. The base-recording data pattern is similar to that described in the first embodiment. The data pattern area 55 is managed by a logical address. After the base-recording data pattern is recorded in the overwriting area 56, the operation is terminated. When the read/write operation command is not issued after the operation is completed, the base-recording data pattern is further recorded in the overwriting area 56 in accordance with the operation procedure of FIG. 12.

When a read/write operation command is issued from the host system 28 to the magnetic disk drive 1 in step S401, the process proceeds to step S404 to perform the read/write operation. When a write operation command is issued, the data instructed to be written is preferentially recorded in the user area 51 recording the base-recording data pattern. That is, when the magnetic disk drive 1 receives a write command from the host system 28, the data to be written is written over the data pattern area 55 as long as there are a data pattern area 55 and an overwriting area 56 on the magnetic disk 11. When the magnetic disk drive 1 receives a write command from the host system 28, the data to be written is recorded in the overwriting area 56 as long as there is no data pattern area 55 but is an overwriting area 56 on the magnetic disk 11.

In the third embodiment, when the assist function is determined to be deteriorated in the recording quality inspection, a base-recording data pattern is recorded when a read/write operation command is not issued. Thus, it is not necessary to record the base-recording data pattern in the write operation, and it is possible to shorten the time required for a series of operations for recording data. In the third embodiment, by recording data over the base-recording data pattern similarly to the first and second embodiments, it is possible to improve the recording quality of the data recorded by the magnetic head 12 having the deteriorated function.

According to at least one embodiment described above, by recording data over a base-recording data pattern, it is possible to provide a magnetic disk drive and a magnetic recording method that can improve the recording quality.

The magnetic disk drive of the present invention is not limited to the above embodiments and can be variously modified. The magnetic disk drive of the present invention may use a shingled magnetic recording method, in which a track having a width narrower than the magnetic head width is recorded, to record data. In addition, the function of each component of the magnetic disk drive in each embodiment shown in FIG. 3 may be implemented not by the MPU but by dedicated hardware. Furthermore, without performing the recording quality inspection or regardless of the result of the recording quality inspection, an operation for writing data over the base-recording data pattern may be performed. That is, in the magnetic disk drive having the assist function, the operation for writing data over the base-recording data pattern may be performed without depending on the deterioration of the assist function or regardless of the assist function being enabled/disabled. Moreover, the operation for writing data over the base-recording data pattern may be performed in a magnetic disk drive that does not have an assist function. The arrangement of the base-recording data pattern and the frequency of the recording magnetic field for recording the base-recording data pattern are optimally designed in consideration of the characteristics of the components of the magnetic disk drive, the data encoding conditions, the degree of deterioration of the assist function, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a magnetic disk;
a magnetic head configured to read/write data from/to the magnetic disk;
a signal processing circuit configured to convert data to be recorded on the magnetic disk into a write signal, and to output the write signal to the magnetic head that generates a recording magnetic field corresponding to the write signal; and
a recording control circuit configured to control the signal processing circuit and the magnetic head to record, in a target recording area of the magnetic disk, first data in a first track of the target recording area with a recording magnetic field having a first frequency, and to record, second data different from the first data in the first track by writing the second data over the first data with a recording magnetic field having a second frequency higher than the first frequency.

2. The magnetic disk drive according to claim 1, wherein the recording control circuit supplies a write data as an input to the signal processing circuit, which in response to the input of the write data outputs the write signal that causes the magnetic head to generate the recording magnetic field having the first frequency.

3. The magnetic disk drive according to claim 1, wherein a first length, which is equal to a distance of an interval where a magnetization direction is reversed in a magnetic layer of the target recording area of the magnetic disk in which the first data is to be recorded, is longer than a length for recording a 1-bit signal in the target recording area.

4. The magnetic disk drive according to claim 1, wherein the recording control circuit controls the magnetic head to record the first data on the magnetic disk when the magnetic head is not reading/writing data from/to the magnetic disk.

5. The magnetic disk drive according to claim 1, wherein the first data has a base-recording data pattern.

6. The magnetic disk drive according to claim 1, wherein the second data is data which a host system has instructed the magnetic disk drive to record on the magnetic disk.

7. A magnetic disk drive comprising:
a magnetic disk;
a magnetic head configured to read/write data from/to the magnetic disk;
a signal processing circuit configured to convert data to be recorded on the magnetic disk into a write signal, and to output the write signal to the magnetic head that generates a recording magnetic field corresponding to the write signal;

a recording control circuit configured to control the signal processing circuit and the magnetic head to record, in a target recording area of the magnetic disk, first data in the target recording area with a recording magnetic field having a first frequency, and to record, second data different from the first data over the first data with a recording magnetic field having a second frequency higher than the first frequency; and an operation comparison circuit, wherein the magnetic head is configured to have an assist function to reduce the coercivity of the surface of the magnetic disk, wherein the operation comparison circuit determines whether the assist function is deteriorated, and wherein the recording control circuit controls the magnetic head to write the first data and overwrite the first data with the second data when the operation comparison circuit determines that the assist function is deteriorated.

8. The magnetic disk drive according to claim 7, further comprising:

a quality index measuring circuit configured to measure a first signal quality index when the assist function of the magnetic head has been enabled and a second signal quality index when the assist function of the magnetic head has been disabled; and a memory configured to store a deterioration threshold to which the operation comparison circuit refers to determine whether the assist function is deteriorated, wherein the operation comparison circuit determines whether the assist function is deteriorated based on the first and second signal quality indexes and the deteriorated threshold.

9. The magnetic disk drive according to claim 8, wherein the quality index measuring circuit controls the memory to record the first and second signal quality indexes, and wherein the operation comparison circuit calculates the difference between the first and second signal quality indexes, and compares the difference with the deterioration threshold stored in the memory to determine whether the assist function is deteriorated.

10. A recording method for the magnetic disk drive, the method comprising:

converting, by a signal processing circuit, data to be recorded on a magnetic disk into a write signal, and outputting the write signal to a magnetic head;

recording, by the magnetic head, first data in a target recording area of the magnetic disk with a recording magnetic field having a first frequency; and recording, by the magnetic head, second data different from the first data over the first data with a recording magnetic field having a second frequency higher than the first frequency, wherein the highest value of the second frequency to be applied to the target recording area is higher than the first frequency, and wherein the highest value of the second frequency to be applied to the target recording area is higher than the highest value of the first frequency applied to the target recording area.

11. The recording method for the magnetic disk drive according to claim 10, wherein the first frequency is a value obtained by dividing the highest value of a frequency of a recording magnetic field applied to the target writing area by an integer.

12. The recording method for the magnetic disk drive according to claim 10, further comprising:

determining whether an assist function of the magnetic head for reducing the coercivity of the surface of the magnetic disk is deteriorated, wherein said converting, recording, and writing are carried out with the second data as target write data upon determining that the assist function is deteriorated.

13. The recording method for the magnetic disk drive according to claim 12, further comprising:

measuring a first signal quality index when the assist function of the magnetic head has been enabled and a second signal quality index when the assist function of the magnetic head has been disabled, wherein the assist function is determined to be deteriorated when a difference between the first and second signal quality indexes exceeds a deterioration threshold.

14. The recording method for the magnetic disk drive according to claim 13, further comprising:

storing the deterioration threshold in a memory device of the magnetic disk drive prior to said determining.

* * * * *